(12) United States Patent
McGowan, III

(10) Patent No.: US 9,988,290 B1
(45) Date of Patent: Jun. 5, 2018

(54) METHOD AND APPARATUS FOR OPERATION OF AEROBIC BIOLOGICAL SOLIDS DIGESTER

(71) Applicant: William D McGowan, III, Bunnell, FL (US)

(72) Inventor: William D McGowan, III, Bunnell, FL (US)

( * ) Notice: Subject to any disclaimer, the term of this patent is extended or adjusted under 35 U.S.C. 154(b) by 277 days.

(21) Appl. No.: 15/062,424

(22) Filed: Mar. 7, 2016

Related U.S. Application Data

(63) Continuation-in-part of application No. 13/869,163, filed on Apr. 24, 2013, now abandoned.

(51) Int. Cl.
  *C02F 3/02* (2006.01)
  *C02F 3/12* (2006.01)

(52) U.S. Cl.
  CPC ...... *C02F 3/1205* (2013.01); *C02F 2301/046* (2013.01); *C02F 2303/06* (2013.01); *C02F 2303/20* (2013.01)

(58) Field of Classification Search
  CPC .... C02F 3/1273; C02F 3/1205; C02F 3/1221; C02F 2209/10; C02F 2303/06; C02F 3/12; C02F 3/121
  USPC .......................................... 210/620, 625, 624
  See application file for complete search history.

(56) References Cited

U.S. PATENT DOCUMENTS

| | | | |
|---|---|---|---|
| 2007/0209998 A1* | 9/2007 | Abu-Orf | C02F 3/12 210/624 |
| 2009/0095674 A1* | 4/2009 | Fujishima | C02F 3/1221 210/611 |
| 2011/0006002 A1* | 1/2011 | Conner | C02F 9/00 210/631 |

* cited by examiner

*Primary Examiner* — Claire A Norris
(74) *Attorney, Agent, or Firm* — Robert O. Wright

(57) ABSTRACT

A method and apparatus for continuous operation of an aerobic metabolic digester in a multi station aerobic wastewater treatment system is disclosed that eliminates the the volume of residuals solids that must be finally disposed of off site and improves the overall efficiency of the treatment system.

6 Claims, 3 Drawing Sheets

US 9,988,290 B1

METHOD AND APPARATUS FOR OPERATION OF AEROBIC BIOLOGICAL SOLIDS DIGESTER

PRIORITY

This application is a continuation-in-part of application Ser. No. 13/869,163 filed Apr. 24, 2013 and the content of said application is incorporated herein in full by reference.

TECHNICAL FIELD

This invention relates to Aerobic Wastewater Treatment Systems widely used for domestic wastewater treatment throughout the United States and the world. More particularly this invention involves processes and apparatus used in the aerobic digestion of excess organic waste sludge found in such wastewater treatment systems.

BACKGROUND

The traditional aerobic wastewater treatment system produces a stream of treated water and a volume of excess organic biologic waste sludge in some proportion to the mass of organic material removed from the wastewater treated. This biological waste activated sludge is then often treated further to reduce its volatile organic content and volume by removal of the water that is released during this further treatment before final removal from the treatment plant for final disposal. The content, tonnage and volume of the excess sludge are major cost factors in the final disposal of the treated waste solids which is usually by land application, landfill, incineration or possibly by commercial sale as fertilizer.

The aerobic digestion of biological residuals from excess waste activated sludge is a commonly used method for reducing the amount of solids that must be finally disposed of from the wastewater system. This is usually accomplished by aerating and mixing the residual solids in a digester holding tank. Excess activated sludge generated by the activated sludge wastewater treatment system is regularly removed from the treatment process and placed in the digester tank. When the digester tank is full the aeration and mixing is stopped, the solids are allowed to settle out to the bottom and the water removed by a process called supernation. This separation may take one or more days during which time the aerobic digestion process is stopped since the aeration must be shut down to allow settling out of the solids. Stoppage of the aeration deprives the microorganisms, responsible for the digestion process, of oxygen needed for respiration and metabolization of the volatile organics in the digester.

A significant portion of the aerobic organisms in the sludge that do the digestion of the organic solids cease metabolic activity and facultative organisms in the solution convert their respiration to their anaerobic mode during the settling out, delaying resumption of the aerobic digestion process when aeration is restarted after removal of the water and solids. After repeated cycles of water removal operation the entire aerobic biological population is depleted to the point where the aerobic digestion process ceases and the entire contents of the digester tank water and solids, whether fully digested or not, must be removed for final disposal.

Another problem frequently encountered surrounding this shutdown period is the release of very objectionable odors such as hydrogen sulfide and ammonia created by the anaerobic biological activity that takes palace during the extended time the aeration is shut off.

OBJECTS OF THE INVENTION

Accordingly it is a broad object of the invention to provide an improved apparatus and method of operation of aerobic wastewater treatment systems.

It is a further object of this invention to provide an improved apparatus and method for reducing the amount of aerobic biological residuals that must be removed from aerobic digesters used in aerobic wastewater treatment systems.

It is another object of the present invention to provide a method of operation for an aerobic biological digester for aerobic wastewater treatment systems that may be operated continuously without interruption of the aeration/mixing process.

It is a still further object of this invention to provide a method of operating an aerobic biological solids residual digester for an aerobic wastewater treatment system that virtually eliminates the amount of sludge that must finally be removed for disposal regularly in the operation of the system.

It is yet another object of this invention to provide an apparatus and method of operation of an aerobic biological digester that substantially reduces odor creation during operation of an aerobic wastewater treatment system.

It is another object of this invention to provide a method of operation of an aerobic biological digester that improves the overall efficiency and reduces the costs of residuals disposal in an aerobic wastewater treatment system.

These and other and further objects are accomplished in part by an aerobic biological residuals digester having a vacuum assisted filter mechanism with a controlled filtrate withdrawal rate and low pressure air filter backwash system.

DESCRIPTION OF PRIOR ART

Figure 1:
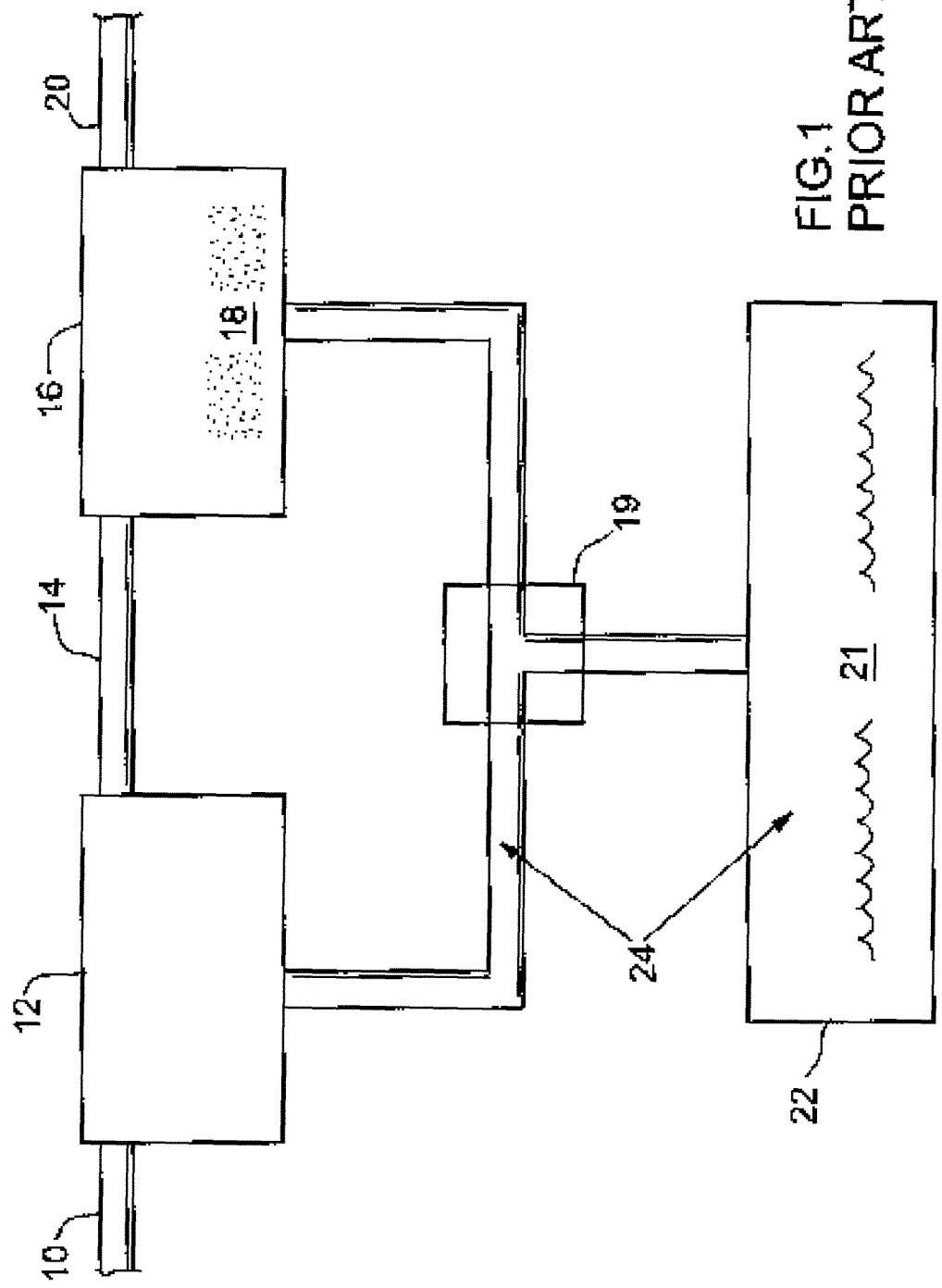
FIG. 1 is a block diagram of a typical aerobic wastewater treatment system.

Referring to FIG. 1 there is shown a typical prior art three station aerobic wastewater treatment system. Raw waste stream 10 is directed into a first screening and aerobic treatment station (not shown) where physical debris is collected and removed followed by a first aerobic biological treatment station 12 where the first aerobic treatment of the waste stream is performed. This may take the form of a single treatment tank or a series of treatment tanks or sites. The treated stream 14 is then fed into a second clarifier settling station tank 16 where the solids 18 are allowed to settle out to the bottom forming a slurry called sludge 18. The clarified water 20 in the clarifier station is then discharged to further treatment, irrigation or the like. depending on the length and/or degree of treatment required. A significant portion of the aerobic treated waste solids 18 is regularly returned to treatment station 12 to maintain and continue the aerobic treatment process.

The excess residuals sludge 18 in the clarifier station 16 ultimately has to be disposed of and to reduce the volume requiring removal to landfill or the like, excess residuals solids 18 are fed to an aerobic digester tank station 22 via valve 19. In the digester tank 22 the slurry of residuals solids 18 are circulated, aerated and mixed into a solution 21 that allows the aerobic biological microorganisms inherent in the residuals solids slurry to metabolize the organic residuals therein into water, soluble minerals, and gasses. As the process continues the released water and the added residuals solids 18 will fill the digester tank 22. In order to remove the excess water, and the solids 18, the circulating, aerating and mixing must be stopped and the solids allowed to settle to the bottom of the tank. During this period excess solids in the clarifier16 are returned directly into a previous treatment station.

After some period of time, hours or even days, the solids in the digester tank 22 have settled enough so the clear liquid supernatant 24 can be removed via separate piping (not shown) or valve 19 again shutting off the flow of residuals 18 and directing supernatant 24 to tank 12. After removal of the supernatant 24 and the residuals solids 18 from the digester tank 22 aeration and mixing are restarted and more sludge solids from the clarifier 16 are then fed into the digester tank 22.

During the settling process many of the facultative organisms in the solids residuals in tank 22 convert their respiration to anaerobic mode, due to the lack of oxygen when the aeration is stopped, and thus delay restarting of the aerobic digestion process. Also during this shutdown period the odor frequently becomes a problem due to the anaerobic action of the facultative organisms in the aeration starved residuals and the stopping of aerobic digestion.

Finally with the introduction of new sludge solids 18, after completion of the supernation, circulation, aeration, and mixing of the slurry in tank 22 is resumed and the aerobic microbiological organisms restart the metabolizing process of volatile organics of any remaining residuals and the newly added residuals to produce water, minerals and gasses as before.

Eventually, depending on the volume of wastewater being treated, and the decreasing digestion efficiency due to the extended non aerated periods required for the settling supernation, the digester tank 22 can accept no more solids and liquids and the process must again be stopped to permit removal of all the solids for final disposal.

While this aerated digester tank 22 process as predominately used in the prior art, reduces the volume of solids 18 that must be taken off site from the clarifier tank 16 via the digester tank 22 for final disposal, the overall efficiency and interrupted limited reduction of residual solids volume removal are costly aspects of the conventional aerobic wastewater treatment systems. This conventional process may also leave non digested volatile residual solids for disposal off site or otherwise.

In a typical prior art small volume three station wastewater treatment facility where in a year about one and a half million gallons of residuals may be treated in an aerobic digester tank, one million gallons of these residuals will be required to be removed from the digester tank station and trucked off site for disposal.

DESCRIPTION OF PRESENT INVENTION

Figure 2:
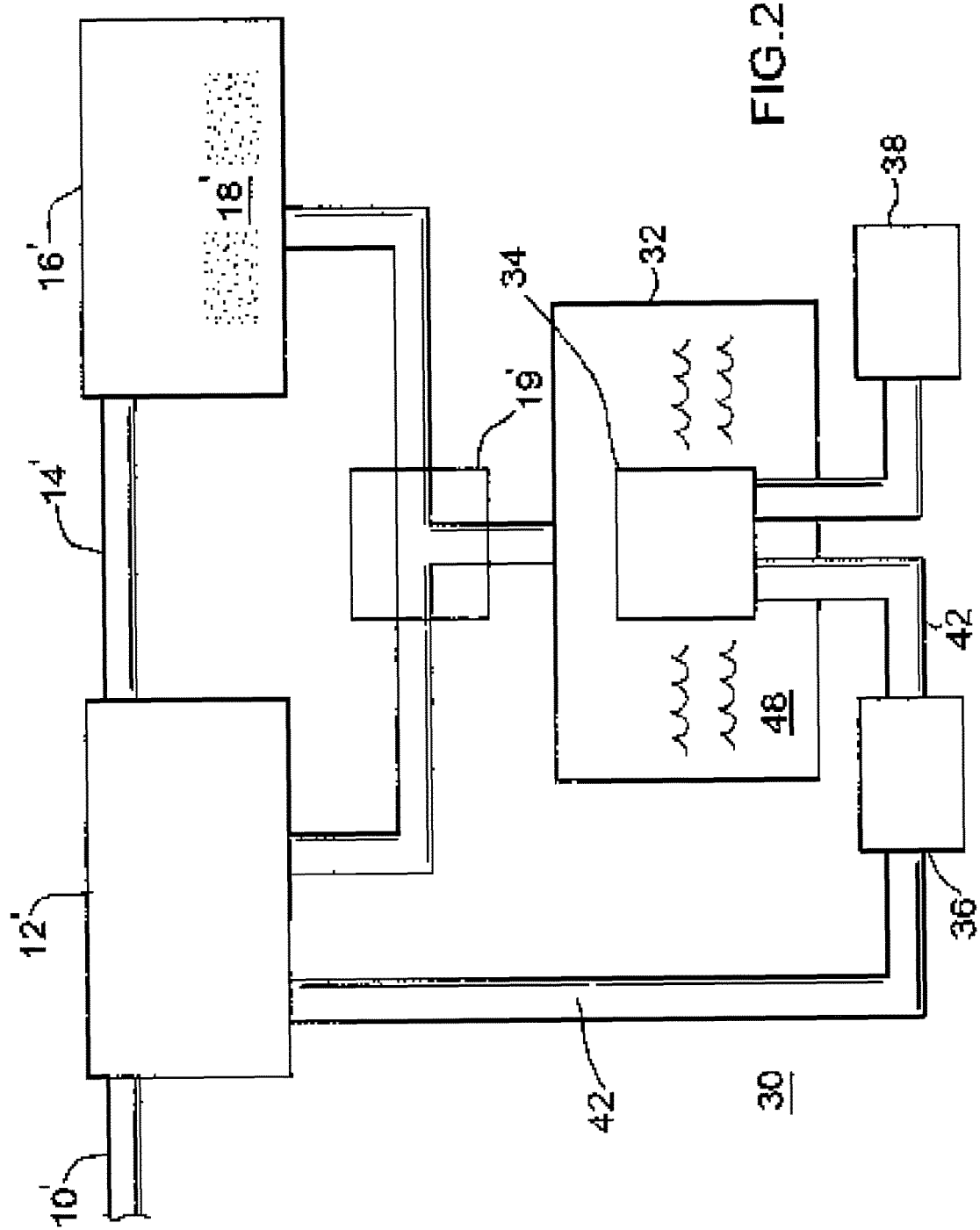
FIG. 2 is a block diagram of the present invention applied to FIG. 1
Figure 3:
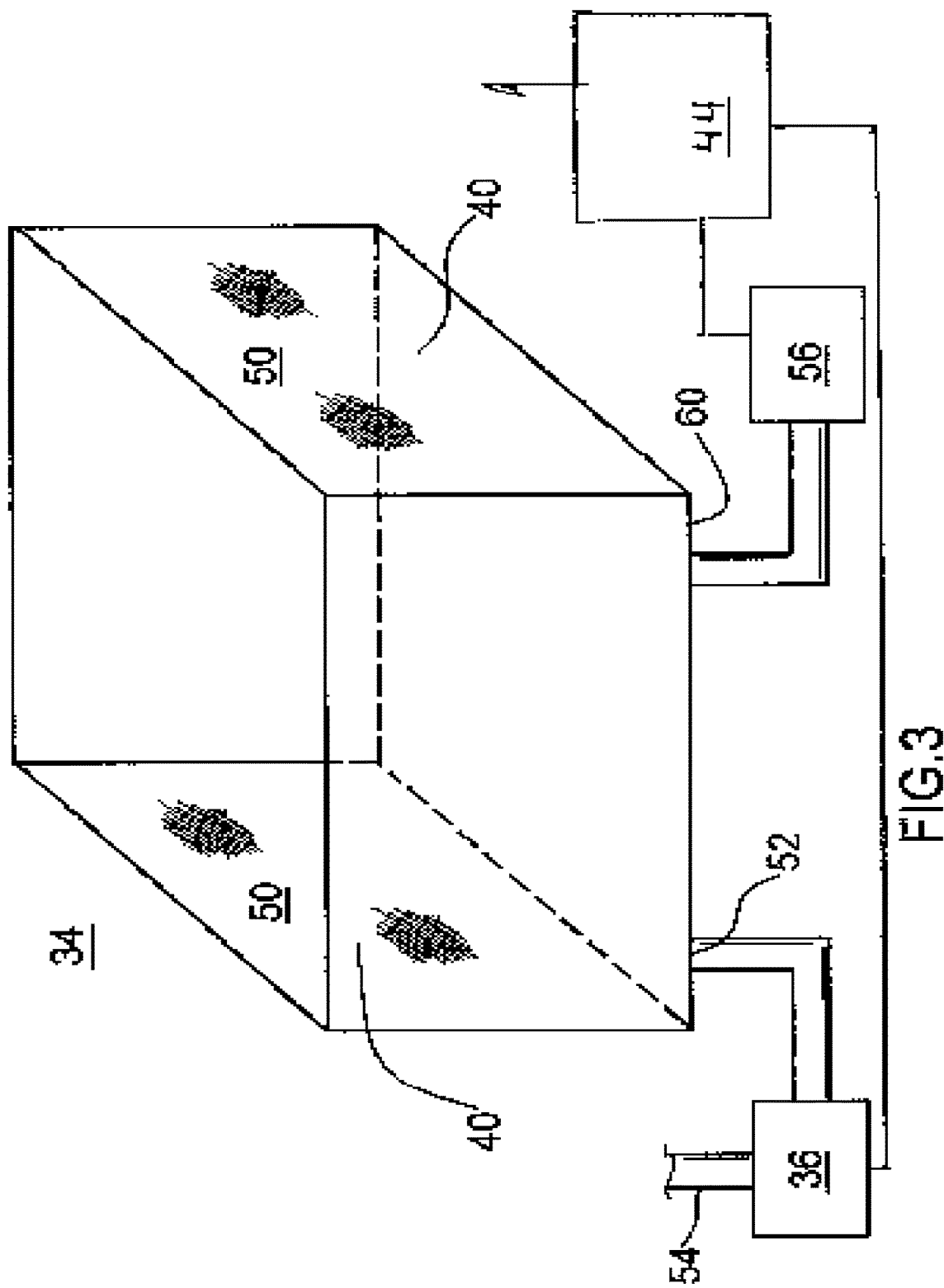
FIG. 3 is a perspective view of a filter chamber.

With the method and apparatus of the present invention as described and shown in FIGS. 2 and 3 the volume of residuals that must be removed and trucked off site is reduced essentially to zero due to the virtual continuous time of aeration of the residuals into water, soluble minerals and gasses, and elimination of aerobic digester station three settling periods. Assuming there are no aerobic undigestible residuals in the sludge being treated in the wastewater treatment facility, according to my invention all the volatile organic residuals may be digested reducing the sludge that has to be taken out of the digester tank station and trucked off site for disposal to zero.

Referring now to FIGS. 2 and 3 there is shown an improved aerobic digester apparatus and method of operation for use in three station aerobic wastewater treatment systems that eliminates the amount of volatile organic residuals sludge requiring final removal and disposal off site or otherwise. By continuous operation of the residual solids digester station along with the normal operation of the basic aerobic wastewater treatment system all sludge is eliminated.

As shown in FIG. 2 the waste stream 10' is fed into treatment station 12' and treated stream 14' to clarifier station 16' as before. Residuals sludge 18' is then fed to an aerobic biological digester station 30 which includes tank 32, filtering chamber 34, pump 36 and low pressure air source 38. The sludge residuals 18' are fed from clarifier station 16' to aerobic digester station 30, circulated, mixed and aerated in tank 32 forming a slurry 48 as before. As in the prior art the aerobic biological microorganisms in the slurry 48 begin digesting the organic solids producing water, soluble minerals and gasses.

As shown in FIGS. 2 & 3 a filtering chamber 34 is positioned in tank 32 so as to be submerged below the surface of the residuals slurry 48 therein. As water is released by the aerobic biological digestion process, pump 36 is activated to produce a vacuum within chamber 34 to produce a continuous flow of supernatant at a controlled rate to be drawn through the filter sides. This causes water (supernatant 42) in the slurry to be drawn through the filter sides 40 (see FIG. 3) of chamber 34 and collected for return to treatment station 12'. This removal of water is accomplished by pump 36 without any interference with the aeration or mixing of the sludge residuals so that the biological microorganisms can continue uninterrupted the breakdown of the organic residual solids in slurry 48 in tank 32 producing more water, soluble minerals and gasses.

The water supernatant 42 is collected in the bottom of filter chamber 34 and pumped back to treatment station 12' and ultimately discharged as treated water 20, without any interference with the digestion process. Generally the longer the aerobic biological process is allowed to work without interruption the more residual solids are digested into water, soluble minerals and gasses.

As supernatant 42 is pumped from the tank 32, an amount of excess sludge residuals 18', is fed into tank 32 from clarifier 16' through valve assembly 19' again without disrupting the digestion process. Overflowing of the digester tank 32 is prevented by control system 44. Thus not only is the overall efficiency of the wastewater treatment process improved the total amount of solids residuals that must be finally disposed of is essentially eliminated. The increased time of aerobic digestion and the constant aerobic access to all the digestible solids in the slurry 48 results in maximized efficiency and elimination of undigested organic residuals for other types of disposal.

Referring now to FIG. 3 filter chamber 34 is shown as a rectangular chamber with two open sides 40 having a filter medium 50 across the sides to filter sludge particles out of water withdrawn from the slurry 48 in tank 32. Filter sides 40 of chamber 34 may be made of a fabric with a pore size of twenty (20) microns or greater capable of screening out the residuals solids 18' but passing the water formed by the aerobic biological digestion of the organic solids. Pump 36 is connected to an outlet 52 in the bottom of chamber 34 and a pipe 54 leading back to station 12. In operation when pump 36 is turned on by control system 44 it pulls a vacuum in chamber 34 which draws water formed by the aerobic digestion of the slurry 48 in chamber 32 into chamber 34 through filters 50 and thence to pump 36 and removal to station 12'. Once started I continuously aerobically digest the sludge from the settling station in my improved digester station process and eliminate the amount of sludge that must be removed.

This is to be contrasted with another wastewater treatment system known as membrane bioreactor systems (MBR) such as shown in U.S. Pat. No. 8,287,733. Membranes with pore sizes of 0.003 to 0.01 microns used in such MBR systems are sometimes required, to directly remove many other types of impurities and contaminants in wastewater treatment systems without any regard to the volume of water created or amount of left over sludge residuals that must be finally removed from the site and thus does not solve the problem addressed by the present invention. The necessary extra purification of the water stream is time consuming, capital intensive and expensive to operate and maintain and usually done elsewhere in the aerobic wastewater treatment system which systems overall efficiency and costs have been substantially improved by the present invention.

Periodically the residuals solids in slurry 48 may accumulate on the outer surface of filter medium 50 of filters 40 limiting water flow therethrough. Control system 44 will sense this condition and turn on a source of low pressure air 56 which is connected to chamber 34 at 60. This supply of air to the entire inside surface of filter screens 40 of chamber 34 is usually enough to force any residual solids on the outer surfaces of filter screens 40 to be blown off and fall back into slurry 48. If not the pump 36 is turned off for the interval necessary to clear off the outer surfaces of screens 40. The air 56 is then turned off and pump 36 is restarted and the water released during aerobic digestion is again withdrawn into chamber 34 and fed back to station 12. Control system 44 is connected to pump 36 and air supply 56 and to the control system of the three station wastewater treatment system in which chamber 34 is installed to coordinate the operation of chamber 34 (turning the pump 36 & air 56 on and off) and maintaining the appropriate level of residuals solids slurry 18 in digester tank 32 for the continued aerobic digestion of the excess residuals sludge formed during the overall operation of the three station aerobic wastewater treatment system. The duration of this vacuum/air control operation can be kept short enough to not materially affect the flow of supernatant water, residuals sludge slurry or the overall system flow of material to be digested.

Alternatively to insure uninterrupted flow of water from digester tank 32 multiple chamber 34s may be installed in tank 32 allowing one chamber's filters to be cleaned while the others maintain removal of the water to maintain fluid levels in the system and/or provide additional quantities of filtered supernatant.

To ensure the process and equipment just described will work continuously so as to eliminate the necessity to stop the process and remove excess sludge in a three station aerobic wastewater processing system, the size of tanks 32 and 34 and pump 36 and air supply 38 must be chosen large enough to process continuously the maximum waste stream 10' that will be encountered together with the supernatant 42 stream created by the aerobic digestion of the sludge. This may take the form of larger tanks or multiple sets of tanks but the capacity to continuously aerobically digest all of the sludge created from the first two stages of the treatment system must be provided, unlike the prior art.

The following set of parameters are being given as an example of such an apparatus for a three station Aerobic Digester System.

There are many methods used for design purposes. I will use numbers based upon my experience in the operation of three station activated sludge wastewater treatment plants.

First Example

All calculations will be based on 1000 gallons (0.001 MGD [million gallons per day] of influent flow. This number should then be multiplied by the appropriate factor to arrive at the actual system flow rate. Flow—0.001 MGD Influent Carbonaceous Oxygen Demand (CBOD5, a measure of the organic content of the wastewater influent.)—250 mg/L Aeration System MLSS (Mixed liquor suspended solids), a measure of the mass of biological solids under aeration and available to treat the incoming flow.—3000 mg/L Return Activated Sludge (RAS) MLSS, a measure of the concentration of biological solids in the sludge after settling during the clarification process, collected on the bottom of the clarifier and returned to the head of the treatment system to mix with influent to provide an active biomass to consume (treat/remove) the organics in the wastewater influent.—6000 mg/L Waste Activated Sludge volume calculation—The volume of excess solids that have been removed from the influent during treatment and should be removed from the main treatment process to prevent loss of solids to the effluent or over oxidation of the influent or excess oxygen demand reducing free oxygen in the system and reducing treatment efficiency.

Waste Solids Produced:

Influent CBOD5 lbs/1000 gal—Flow 0.001 MGD×Influent CBOD5 250 mg/L×8.34 lbs/gal. of water=2.085 lbs/1000 gal. Waste Solids per day/1000 gal Waste Activated Sludge (WAS) mass calculation—RAS 6000 mg/L×0.001 MGD×8.34=50.04, 50 lbs MLSS/1000 gal. WAS.

Treatment system CBOD5 removal efficiency=90% =Excess solids production rate 2.085 lbs Influent CBOD5× 90%(0.9)=1.8765, 1.9 lbs excess/1000 gal of influent flow. WAS rate—50lbs/1000 gal.@0.05 lbs/gal.=0.05 lbs MLSS/gal.=1.9 lbs. excess/0.05 lbs per gal. WAS=38 Gal WAS/1000 of treated influent.

A small plant may treat 50,000 (0.050 MGD) gal. per day. Using the above calcs.@0.050 MGD the plant would produce 50 k×1.9# excess solids=95 ppd (pounds per day) excess solids. WAS@50 lbs solids per 1000 gal WAS=95/50 =1.9×1000=1900 gpd WAS to digester. Therefore if 1900 gpd should be added to the digester daily then 1900 gal of water must be removed from the digester daily. Supernatant flow rate calculation 1900 gal./1440 min./24 hrs.=1.32 gpm or 5000 ml/min. If one ft2 of filtration area can produce 1000 ml per minute which equals 0.264 gpm/ft2 of filter surface then 1000 ml/ft2/min×5=5000 ml/ min. Then 5 ft2 of filtration surface area will be required to produce the required water removal rate, supernatant flow.

Second Example 1. 1.0 MGD design treatment capacity
2. 250 mg/L Influent CBOD5
3. 250mg/L×1MGD×8,34 lbs/gal=2085 lbs/day Influent CBOD5
4. 2085 Inf. CBOD5×90% removal (0.9)=1876.5 lbs/day CBOD5 removed from influent per day 5. Calc. based on 1 lb of excess solids (as MLSS) produced per lb CBOD5 Removed per day=1876.5 lbs. of excess solids (MLSS) produced per d 6. Waste Activated Sludge solids concentration (MLSS) =6000 mg/L 7. 6000 mg/L×0.001 MGD×8.34=50 lbs MLSS/0.001 (1000) WAS.

8. 1876.5 lbs excess MLSS/50 lbs/1000 gal WAS=37,530 gal./day WAS to add to digester/day=26.1 GPM WAS added to digester/day.

9. Supernatant to be withdrawn from digester to provide capacity for daily WAS addition=26.1 GPM Supernatant/filtrate withdrawal rate.

10. Calculated supernatant/Filtration rate (as shown above)=0.2643 gal/ft2/min.=26.1 GPM/0.2643/min=98.75 (99) ft2 of filtration surface required to produce adequate capacity in the digester for daily WAS addition.

From these calculations it can be seen that a calculable steady, water withdrawal rate from aerobic digestion of residuals sludge in the third digester station is required to successfully operate this system.

While there are given above certain specific examples of this invention and it's application in practical use, it should be understood that they are not intended to be exhaustive or to be limiting of the invention. On the contrary these illustrations and explanations herein are given in order to acquaint others skilled in the art with this invention and the principles thereof and a suitable manner of its application in practical use.

I claim:

1. The method of operating uninterruptedly an aerobic residuals solids sludge digester tank station in an aerobic sludge wastewater treatment system having at least an aerobic biological treatment station, a clarifier settling station and a biological residuals solids sludge aerobic digester tank station comprising:
    aerating and mixing continuously and uninterruptedly the biological activated sludge residuals in said digester tank station produced from normal operation of said wastewater treatment system and transferred from said clarifier settling station, causing biological microorganisms therein to aerobically digest organics in said biological sludge residuals releasing water, soluble minerals, and gases forming an aerated solution of water, soluble minerals, gases and activated sludge residuals in said digester tank station;
    filtering out and removing from said digester tank station water, released by said aerobic digesting of organics in said digester tank station, and returning said removed filtered water to the aerobic activated sludge wastewater system aerobic biologic treatment station;
    continuously introducing additional quantities of activated sludge residuals from said clarifier settling station into said digester tank station of said activated sludge wastewater treatment system;
    continuing uninterruptedly aerating and mixing existing activated sludge residuals and said additional quantities of activated sludge residuals introduced into said digester tank station to facilitate continued aerobic digestion of the organics in said activated sludge residuals releasing water, soluble minerals, and gases forming an aerated solution of water, soluble minerals, gases and activated sludge residuals in said digester tank station;
    continuing uninterruptedly filtering out, removing, and returning water, released by the aerobic digesting of biological organics in said digester tank station, into said aerobic biological treatment station of said wastewater treatment system.

2. The method of claim 1 further including;
    controlling the rates of:
        introduction of additional solids into said digester tank station;
        removal of water released in said digester tank station and transfer to said aerobic biological treatment station;
    to aerobically digest all the organic residual solids in said digester station whereby aggregation of residual solids sludge in said digester tank station requiring removal to landfill or the like disposal, is eliminated without use of any other additional or supplementary treatment protocols such as flocculation additives, nutrient additions, tankage or solids concentrations devices or equipage other than aeration.

3. The method as claimed in claim 1 wherein said continuing uninterruptedly filtering out and removing water from said aerobic sludge digester tank includes:
    placing an empty filter chamber having at least one surface area formed of a filter material into said digester tank;
    creating a vacuum in said filter chamber to draw water through said filter material surface of said filter chamber into said filter chamber;
    collecting and withdrawing water drawn through said filter material surface into said filter chamber and returning it into said aerobic biological wastewater treatment station
    periodically interrupting the vacuum in said filter chamber and injecting a stream of low pressure air into said filter chamber to blow off any accumulated sludge residuals on the outer surface of said filter material back into the aerated digester tank solution;
    resuming creating a vacuum in said filter chamber to draw off water released by said aerobic digestion of organics in said digester tank through said filter material into said filter chamber and returning said drawn off water to said aerobic biological wastewater treatment station.

4. The method as claimed in claim 3 further including placing more than one empty filter chamber having at least one surface covered with a filter material into said digester tank;
    periodically interrupting the vacuum in one or more of the chambers while maintaining the vacuum in others and injecting a stream of low pressure air into said chamber to blow off any accumulated sludge residuals on the outer surface of said chamber filter material back into said aerated digester tank solution;
    periodically stopping the low pressure air and resuming the vacuum in said one or more of the chambers; and
    periodically repeating the stopping and starting of the vacuum and air in one or more of the chambers placed in said digester tank.

5. The method as claimed in claim 3 wherein said filtration member is a membrane having a particle retention capability of 20 microns or greater.

6. The method as claimed in claim 3 wherein said water filtration member is a filter material having a pore size of 20 microns or greater.

* * * * *